Patented June 29, 1926.

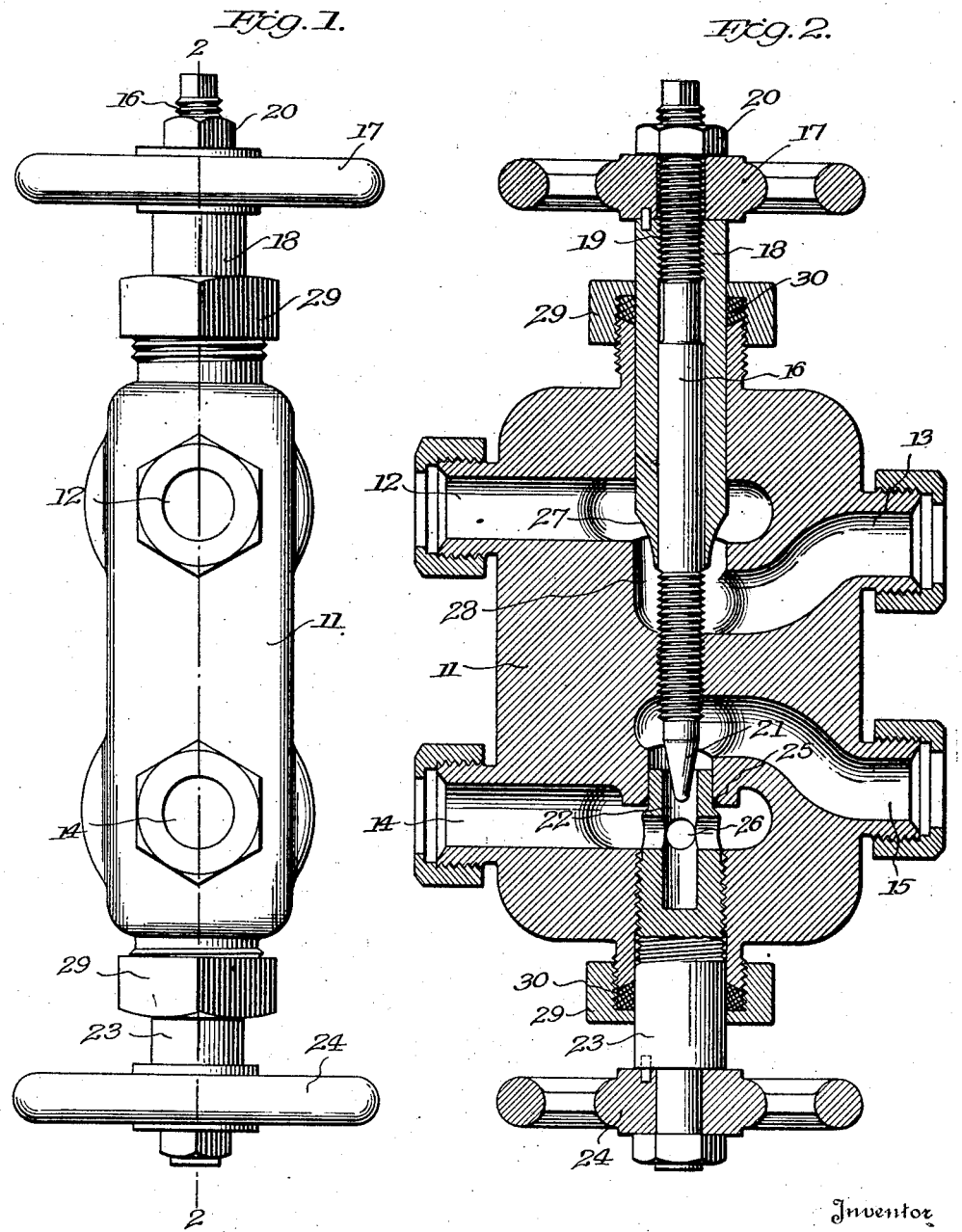

1,590,323

UNITED STATES PATENT OFFICE.

FRANK H. SCHUBERT, OF ST. LOUIS, MISSOURI.

MULTIPLE REGULATOR VALVE.

Application filed August 23, 1924. Serial No. 733,778.

This invention relates to valves for simultaneously regulating the flow in a plurality of pipes, such, for example, as the oil and air or steam pipes supplying a liquid hydrocarbon fuel burner. The invention aims to provide for easy control of the supply through both pipes, both as to the quantity and the relative proportions of the respective fluids, to suit fluctuations in the demand for one or both.

The invention further aims to maintain proper proportions of oil and air or steam in all operating positions of the regulator valve.

In the drawings illustrating the invention,

Fig. 1 is a side view of a duplex regulator valve embodying the invention, and

Fig. 2 is a central longitudinal section of the same, on the line 2—2 in Fig. 1.

The illustrative embodiment of the invention is designed primarily for regulating the flow of fluid to a liquid hydrocarbon burner and comprises a valve body 11 having inlet and outlet ducts 12, 13, for air or steam, and inlet and outlet ducts 14, 15, for oil or other liquid hydrocarbon fuel. These inlet and outlet ducts are connected to each other by axially alining valve seat portions and are fitted with suitable means for attachment to the supply pipes and burner connections, respectively. A valve stem 16 provided with a handwheel 17 is axially arranged in the casing to intersect the ducts for the air or steam and the oil. This valve stem is threaded in the valve body 11 for axial adjustment therein, and has a sleeve portion 18 also adjustable axially by means of screw threads 19; and the sleeve and hand-wheel are secured in adustable position on the stem by means of a nut 20. The outer end of the stem 16 is squared to aid in adjusting it with respect to the sleeve.

The inner end of the stem 16 has a conical or other form of tapered point 21 for cooperating with the opening 22 in the inner end of the adjustable valve seat 23 for the oil duct. The stem of the valve seat 23 is threaded into the valve body 11, and is provided with a handwheel 24 on its outer end for axially adjusting it toward and from the seat portion 25 of the oil duct. The opening 22 is in free communication with inlet duct 14 by means of holes 26.

The inner end of the sleeve 18 likewise has a tapered portion 27 preferably concave on a parabolical curve in cross-sectional shape, for cooperating with the axial seat portion 28 of the air or steam duct.

Screw caps 29 and packing 30 or other suitable means may be provided for preventing leakage around the valve stem sleeve 18 and valve seat 23.

In operating a liquid hydrocarbon burner for locomotive or other boilers, for example, wherein the demand for steam is subject to rapid and extreme fluctuation, it is desirable to be able to open or close both the steam or air valve and oil valve simultaneously without altering the relative proportions of the mixture, or with only such change in the relative proportions as to maintain the best conditions for complete combustion. This result may be attained by suitably shaping the tapered valve surfaces 21 and 27.

It is also desirable to vary the amount of oil valve opening at any air or steam valve opening for different grades of oil and for changes in temperature which affect the fluidity of the oil. Both objectives may readily be secured with my improved regulator valve by setting and locking the adjustable sleeve 18 on the valve stem 16 to suit the grade of oil at normal running temperature, the adjustable valve seat 23 being closed against its seat 25; and upon starting the burner with everything cold (or if for any reason a greater proportion of oil is needed) the oil supply may be temporarily increased by opening the valve 23 and as the furnace and operating parts attain their normal running temperature this valve may be closed to restore the normal proportions.

My improved regulator valve has the advantage of being adjustable to vary the proportionate amount of fuel at will temporarily without interfering with the normal valve adjustment, whereby the proper proportions of fuel and air or steam may be restored and maintained with certainty and without trouble or delay for all openings of the valve.

My improved regulator valve is simple and compact, not easily subject to breakage or disarrangement of parts and comparatively cheap to manufacture. Worn or broken parts may be readily renewed without disconnecting the valve body from its connections.

It is evident that the invention is applicable to other uses than regulating liquid fuel for hydrocarbon burners and it is not restricted to that described.

Having shown and described one illustrative form of the invention without restricting the invention thereto, what I claim is as follows:

1. A regulator valve comprising a body, a plurality of ducts therein, said ducts having inlet and outlet portions connected by axially alined valve passages, a valve stem axially disposed in said body having axially adjustable valve portions associated with said valve passages, respectively, and means for moving said valve stem and valve portions to open or close said passages simultaneously.

2. A regulator valve comprising a body, a plurality of ducts therein, said ducts having inlet and outlet portions connected by axially alined valve passages, a valve stem axially disposed in said body having axially adjustable valve portions associated with said valve passages, respectively, means for securing said valve portions in adjusted position, and means for moving said valve stem and valve portions to open or close said passages simultaneously.

3. A regulator valve comprising a body, a plurality of ducts therein, said ducts having inlet and outlet portions connected by axially alined valve passages, a valve stem axially disposed in said body having axially adjustable valve portions associated with said valve passages, respectively, a valve seat adjustably arranged in one of said passages and means for moving said valve stem and valve portions in adjusted position relatively to each other.

4. A regulator valve comprising a body, a plurality of ducts therein, said ducts having inlet and outlet portions connected by axially alined valve passages, a valve stem axially disposed in said body having axially adjustable valve portions associated with said valve passages, respectively, a valve seat adjustably arranged in one of said passages, said valve seat having a normal position and means for restoring it to normal position from adjusted position, and means for moving said valve stem independently of the position of said valve seat.

5. A regulator valve comprising a body, a plurality of ducts therein, said ducts having inlet and outlet portions connected by axially alined valve seat portions, a valve stem axially disposed in said body having a sleeve axially adjustable thereon, said valve stem and sleeve having their inner ends tapered to form valve faces respectively associated with said valve seat portions, and means for moving said valve stem and sleeve simultaneously to open and close said valves in proportion to their respective degrees of taper.

6. A regulator valve comprising a casing 11, having a plurality of passages therein, a valve stem 16 having a sleeve 18 adjustable thereon, said valve stem and sleeve having tapered valve portions 21, 27, at their inner ends respectively cooperating with said passages, said valve stem having its outer end threaded through said sleeve and provided with means for turning it relatively thereto, and a nut 20 threaded on said stem for locking said sleeve in adjusted position on said stem.

7. A regulator valve comprising a casing 11, having a plurality of inlet and outlet passages therein, a valve stem 16 having a sleeve 18 adjustable thereon, said valve stem and sleeve having valve portions 21, 27, at their inner ends, respectively cooperating with said passages, said valve stem having its outer end threaded through said sleeve and provided with means for turning it relatively thereto, a handwheel 17 on said stem for rotating it, and a nut 20 threaded on said stem for locking said sleeve and hand-wheel in adjusted position on said stem.

8. A regulator valve comprising a casing 11, having a plurality of inlet and outlet passages therein, a movable seat 23 in one of said passages, a valve stem 16 having a sleeve 18 adjustable thereon, said valve stem and sleeve having valve portions 21, 27, at their inner ends, respectively cooperating with said seat and other passage, said valve stem having its outer end threaded through said sleeve and provided with means for turning it relatively thereto, and means for moving said seat and stem independently.

9. A regulator valve comprising a casing 11, having a plurality of inlet and outlet passages therein, a movable seat 23 having an opening 22 communicating with an inlet passage, a shoulder 25 against which said seat is adapted to bear in normal position in one of said passages, a valve stem 16 having a sleeve 18 adjustable thereon, said valve stem and sleeve having valve portions 21, 27, at their inner ends, respectively cooperating with said seat and other passage, and means for moving said seat and stem independently.

10. A regulator valve having a body and two axially alined valve seats, one of which is axially movable with respect to the other, a valve stem having two concentric valve portions, one of which is adjustable axially with respect to said stem, each of said portions cooperating with a different one of said valve seats, and means for readily restoring said movable valve seat to normal position with respect to said valve stem.

11. A regulator valve having a body and two axially alined valve seats, one of which is axially movable with respect to the other, a valve stem having two concentric valve portions one of which is adjustable axially with respect to said stem, each of said portions cooperating with a different one of said valve seats, means for adjusting said concentric portions and movable valve seat independently, and for readily restoring said movable valve seat to normal position with respect to said valve stem without affecting the adjustment of the latter.

12. A multiple regulator valve having a plurality of seats and independently and simultaneously adjustable valves therefor, means for adjusting one of said seats independently of said valve adjustment, and means for restoring normal adjustment thereof, substantially as described.

In testimony whereof, I have signed my name to this specification.

FRANK H. SCHUBERT.